(12) United States Patent
Huang et al.

(10) Patent No.: US 7,960,306 B2
(45) Date of Patent: Jun. 14, 2011

(54) PHOTO-ENERGY TRANSFORMATION CATALYSTS AND METHODS FOR FABRICATING THE SAME

(75) Inventors: Jau-Chyn Huang, Hsinchu (TW);
Wen-Sheng Chang, Pingtung (TW);
Ming-Shan Jeng, Sijhih (TW);
Pei-Chun Chen, Puyan Township (TW);
Tai-Chou Lee, Taipei (TW);
Ching-Chen Wu, Tanzih Township (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 12/249,862

(22) Filed: Oct. 10, 2008

(65) Prior Publication Data

US 2009/0298679 A1    Dec. 3, 2009

(30) Foreign Application Priority Data

May 28, 2008   (TW) ................. 97119686 A

(51) Int. Cl.
*B01J 27/02* (2006.01)
(52) U.S. Cl. ................. 502/216
(58) Field of Classification Search .......... None
See application file for complete search history.

(56) References Cited

U.S. PATENT DOCUMENTS

| | | | |
|---|---|---|---|
| 6,518,086 B2 | 2/2003 | Beck et al. | |
| 6,537,845 B1 * | 3/2003 | McCandless et al. | 438/93 |
| 6,653,701 B1 * | 11/2003 | Yamazaki et al. | 257/414 |
| 7,091,136 B2 | 8/2006 | Basol | |
| 7,262,392 B1 | 8/2007 | Miller | |
| 2008/0152836 A1 * | 6/2008 | Huang et al. | 427/532 |

FOREIGN PATENT DOCUMENTS

| | | |
|---|---|---|
| CN | 1577899 | 2/2005 |
| CN | 1599082 | 3/2005 |
| CN | 1842920 | 10/2006 |
| JP | 3064973 | 3/1991 |
| JP | 5234894 | 9/1993 |
| JP | 6263442 | 9/1994 |
| JP | 11135881 | 5/1999 |

OTHER PUBLICATIONS

Niesen et al, Review: Deposition of Ceramic Thin Films at Low Temperatures from Aqueous Solutions, 2001, Journal of Electroceramics, 6, pp. 169-207.*
Akaki et al, Structural and electrical characterization of AgInS2 thin films grown by single source thermal evaporation method, 2005, Journal of material science: materials in electronics, 16, pp. 393-396.*

(Continued)

*Primary Examiner* — Melvin C Mayes
*Assistant Examiner* — Stefanie Cohen
(74) *Attorney, Agent, or Firm* — Lowe Hauptman Ham & Berner, LLP

(57) ABSTRACT

Photo energy transformation catalysts and methods for fabricating the same are provided. The method includes mixing a solution containing a positive valence element of Group IB, a solution containing a positive valence element of Group IIIA, and a solution containing a negative valence element of Group VIA to obtain a composition and forming a film from the composition by liquid phase deposition, wherein the film contains compounds including the elements of Group IB, Group IIIA, and Group VIA.

14 Claims, 4 Drawing Sheets

OTHER PUBLICATIONS

Auguilera et al, some physical properties of chalcopyrite and orthorhombic AgInS2 thin films prepared by spray pyrolysis, 2003, materials science and engineering B102 pp. 380-384.*

Yahmadi et al, structural analysis of indium sulphide thin films elaborated by chemical bath depsotiion, 2005, solid thin films, vol. 473, pp. 201-207.*

Hu et al, preparation and phase control of nanocrystalline silver indium sulfides via a hydrothermal route, 2001.*

Yoshino et al, growth and characterization of p-type agins2 crystals, 2003, journal of physics and chemistry of solids, 64, pp. 1839-1842.*

Lin et al, growth of crystalline agin5s8 thin films on glass substrates from aqueous solutions, 2007, crystal growth and design, vol. 7 No. 12, pp. 2725-2732.*

* cited by examiner

PHOTO-ENERGY TRANSFORMATION CATALYSTS AND METHODS FOR FABRICATING THE SAME

CROSS REFERENCE TO RELATED APPLICATIONS

This application is based upon and claims the benefit of priority from the prior Taiwan Patent Application No. 97119686, filed on May 28, 2008, the entire contents of which are incorporated herein by reference.

BACKGROUND OF THE INVENTION

1. Field of the Invention

The invention relates to a catalyst and methods for fabricating the same, and more particularly to a photo-energy transformation catalyst and methods for fabricating the same.

2. Description of the Related Art

Exhaustion of fossil fuel resources is approaching. Use of fossil fuels is known to cause serious pollution and environmental destruction. Therefore, a clean energy source, such as wind power, biomass energy, and solar energy, which does not generate harmful waste, is required. Thus, alternative energy sources have been proposed to reduce dependence on fossil fuels and curb pollution.

Among the alternative energy sources, solar energy is already in widespread use. Technology for harnessing solar energy has been in development in hopes of establishing a clean, safe, and non-depleting power source. Solar power technologies can be classified as either solar thermal energy or solar light energy. Particularly, solar energy has generally relied upon the direct conversion of photonic energy to electrical energy through the use of photovoltaic cells, i.e. solar cells.

The conversion efficiency of solar cells depends on the semiconductor materials employed thereby. The semiconductor materials of solar cells can be classified as silicon, inorganic compound, and organic semiconductor materials. The silicon wafer-based solar cells have superior conversion efficiency (about 25%), but have the disadvantages of being expensive, having a large volume and having resource deficiencies.

In order to solve the aforementioned problems, film semiconductor solar cells have been developed and are the main type of solar cells used in solar technology. Examples of film semiconductor solar cell materials include: $Cu(InGa)Se_2$ (CIGS), CdTe and amorphous hydrogenated silicon (disclosed by the NREL group), wherein the thin-film CIGS solar cell has superior conversion efficiency.

To efficiently convert the entire spectrum of sunlight to electrical energy, light-absorbing layers having different band gap energies should be arranged in a multilayered structure. In this manner, a cell termed a "tandem cell" can be fabricated by continuously or discontinuously varying the compositions of light-absorbing layers. It is known that the theoretical energy conversion efficiency of lamination having more than two light-absorbing layers (having different band gap energies) can be more than 40%.

$AgInS_2$ has a band gap energy of between 1.87~2.03 eV and $AgIn_5S_8$ has a band gap energy of between 1.80 eV~1.90 eV, that are suitable for matching the band gap energy of CIGS (1.0~1.7 eV), thereby promoting the conversion efficiency of solar cells.

JP6263442 discloses a method for producing $AgInS_2$ by mixing powdery silver sulfide with powdery indium sulfide to form a colloid, then coating the colloid on substrate, and subjecting the coating to a thermal treatment. However, it is difficult to control the uniformity and adhesion of the obtained $AgInS_2$ film. Further, JP5234894 disclose a method for producing $AgInS_2$ film by sputtering. However, since sputtering vacuum equipment is expensive, the high costs limit mass production of $AgInS_2$ film.

Therefore, the invention provides a method for preparing $AgInS_2/AgIn_5S_8$ with high quality and low cost. Further, the method of the invention can prepare compounds with specific ratio between Ag, In, and S. Either $AgInS_2$ or $AgIn_5S_8$ film is suitable material for thin film solar cells. Since the hybrid combination of $AgInS_2/AgIn_5S_8$ has valance band and conduction band suitable for water decomposition, the hybrid combination of $AgInS_2/AgIn_5S_8$ can be applied to produce hydrogen gas by water splitting or to produce C1 fuel from carbon dioxide.

BRIEF SUMMARY OF THE INVENTION

An exemplary embodiments of a method for fabricating photo energy transformation catalysts comprises preparing a composition by mixing a solution containing a positive valence elements of Group IB, a solution containing a positive valence elements of Group IIIA, and a solution containing a negative valence elements of Group VIA, and forming a film from the composition by a liquid phase deposition process on a substrate, wherein the film comprises a compound having an elements of Group IB, an elements of Group IIIA, and an elements of Group VIA. Particularly, a molar ratio between the elements of Group IB, the elements of Group IIIA, and the elements of Group VIA is 1:1~0.1:1~10, and a molar ratio between the elements of Group IB and the elements of Group IIIA is 1:0.01~1:10. Further, the method further comprises subjecting the film to an annealing treatment, thereby enhancing the crystallization configuration of the film.

In another exemplary embodiments of the invention, the film can comprise at least two compounds with different atomic ratios of elements of Group IB/elements of Group IIIA/elements of Group VIA, wherein the atomic ratio of the elements of Group IB/elements of Group IIIA/elements of Group VIA of the at least two compounds is modified by the molar ratio between the elements of Group IB and the elements of Group IIIA of the composition. The method of the invention can prepare a photo energy transformation catalyst comprising compounds with specific ratios between Ag, In, and S Yet another exemplary embodiments of the invention provides a photo energy transformation catalyst comprising an Ag/In/S compound. Further, the photo energy transformation catalyst can comprise a hybrid combination of $AgInS_2/AgIn_5S_8$.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
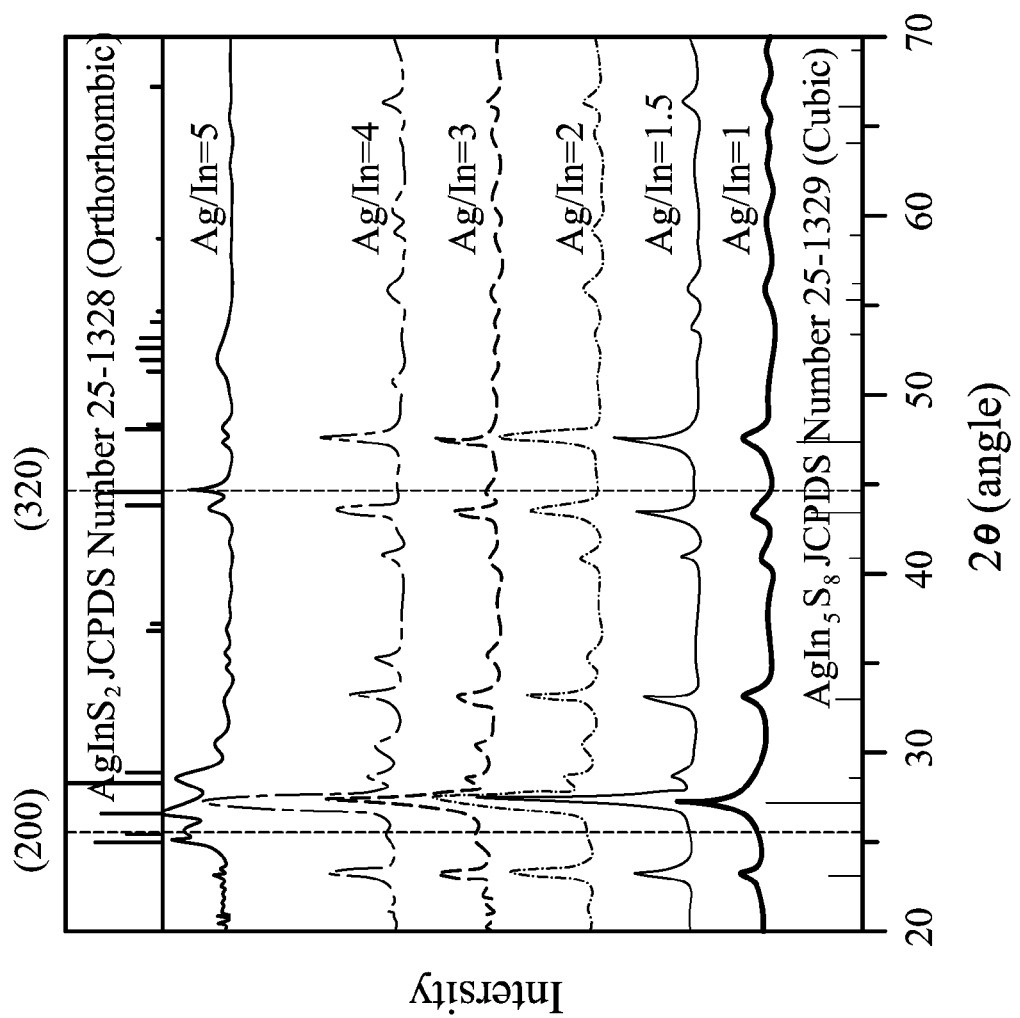
FIG. 1 is a grazing-incidence X-ray diffraction pattern of the films A-F of Example 1.

The invention provides a method for fabricating photo energy transformation catalysts comprising preparing a composition by mixing a solution containing a positive valence element of Group IB, a solution containing a positive valence element of Group IIIA, and a solution containing a negative valence element of Group VIA, and forming a film from the composition by a liquid phase deposition process on a substrate, wherein the film comprises a compound having the elements of Group IB, the elements of Group IIIA, and the elements of Group VIA. Particularly, a molar ratio between the elements of Group IB, the elements of Group IIIA, and the elements of Group VIA is 1:1~0.1:1~10, and a molar ratio between the elements of Group IB and the elements of Group IIIA is 1:0.01~1:10. Further, the method comprises subjecting the film to an annealing treatment, thereby enhancing the crystallization configuration of the film.

Particularly, the elements of Group IB comprise Cu, Ag, or Au, and the solution containing a positive valence element of Group IB comprises silver nitrate. The elements of Group IIIA comprise B, Al, Ga, In, and Tl, and the solution containing a positive valence element of Group IIIA comprises indium nitrate. The elements of Group VIA comprises O, S, Se, Te, or Po, and the solution containing a positive valence element of Group VIA comprises thioacetamide (TAA). The volume ratio between the solutions containing a positive valence element of Group IB and positive valence element of Group IIIA and the solution containing a negative valence element of Group VIA is 1:1~1:20.

According to an embodiment of the invention, the liquid phase deposition comprises a chemical bath deposition (CBD) process, and the temperature of the chemical bath deposition process is between 40 and 90° C. The substrate can be a conductive substrate, such as a metal substrate, a glass substrate with a conductive layer, a silicon wafer, or a plastic substrate.

Further, the composition can further comprise a complex agent. Namely, the composition can be prepared by mixing the solution containing a positive valence element of Group IB, the solution containing a positive valence element of Group IIIA, the solution containing a negative valence element of Group VIA, and the complex agent. After preparing the composition with the complex agent, an acid solution can be added into the composition until the pH value is not more than 1, more preferably less than 1, and most preferably not more than 0.5. It should be noted that the specific pH value can facilitate the chemical bath deposition process. The complex agent can have a concentration of between 0.3 M~0.5 M and comprises an ammonia nitrate aqueous solution, a triethanolamine (TEA), or a combination thereof, preferably an ammonia nitrate aqueous solution. The acid solution can comprise hydrochloric acid, sulfuric acid, acetic acid, nitric acid, or phosphoric acid.

According to an embodiment of the invention, the method for fabricating photo energy transformation catalysts can produce Ag/In/S compounds (i.e. a compound comprising the elements of Ag, In, and S) with specific atomic ratios between Ag, In, and S. Examples of Ag/In/S compounds can comprise $AgInS_2$, $AgIn_5S_8$, or hybrid a combination thereof. The method for fabricating photo energy transformation catalysts of the invention can prepare a hybrid combination of $AgInS_2$, and $AgIn_5S_8$ with a modifiable molar ratio.

In some embodiments of the invention, Ag/In/S films are formed by a chemical bath deposition process. Herein, the solution comprising silver nitrate is used to produce silver ion and indium ion. The solution comprising thioacetamide is used to produce sulfur ion in an acid condition. Further, an ammonia nitrate aqueous solution and a triethanolamine solution serve as a complex agent. The chemical reaction equation of Ag/In/S film formed by the chemical bath deposition process is shown below:

$$CH_3CSNH_2 + H^+ \rightarrow H_2S + CH_3CNH^+$$

$$H_2S + H_2O \rightarrow HS^- + H_3O^+$$

$$HS^- + H_2O \rightarrow S_2^- + H_3O^+$$

$$Ag^+ + (5-4x)In^{3+} + (8-6x)S^{2-} \rightarrow xAgInS_2/(1-x)AgIn_5S_8$$

$$X=0~1$$

In the method for fabricating photo energy transformation catalysts, a substrate is provided after being cleaned. Next, the composition is prepared in accordance with a specific molar ratio of positive (silver and indium ion) and negative (such as sulfur ion) ions. Next, the substrate is immersed in the composition to form an Ag/In/S film on the substrate under a controlled temperature. The key points of the method comprises a metal ion concentration, a sulfur ion concentration, a pH value, a complexing agent and a concentration thereof, and a reaction temperature, which influences the uniformity and thickness of the Ag/In/S film.

The following examples are intended to illustrate the invention more fully without limiting their scope, since numerous modifications and variations will be apparent to those skilled in this art.

Preparation of the film comprising photo energy transformation catalysts

Example 1

Films with Different $AgInS_2/AgIn_5S_8$ Ratios

A glass substrate with an indium tin oxide (ITO) film (1 cm×5 cm) was provided and then washed by methanol with ultrasonic agitation for 30 mins. After drying with DI water, the substrate was washed by acetone with ultrasonic agitation for 30 mins. After drying with DI water, the substrate was subjected to nitrogen flow.

Next, 10 ml of silver nitrate and 10 ml of indium nitrate was mixed. Particularly, the molar ratios of [Ag]/[In] were respectively modified as 1, 1.5, 2, 3, 4, and 5 to prepare compositions A, B, C, D, E and F, wherein the concentration of silver nitrate was fixed at 0.4 M and the concentrations of indium nitrate was optional at 0.4 M, 0.266 M, 0.2 M, 0.133 M, 0.1 M, or 0.08 M. Next, 5 ml of ammonia nitrate aqueous solution (0.4M) and 5 ml of triethanolamine (7.4 M) (serving as a complex agent) were added into the compositions A, B, C, D, E and F, respectively. After stirring for 30 mins, a sulfuric acid was added into the compositions until the pH value was about 0.5.

Next, 0.4 M thioacetamide was respectively added into the compositions A-F, wherein the volume ratio between the composition and thioacetamide was 1:4. Next, the compositions A-F were used to form coatings by a chemical bath deposition process at 80° C. for 30 mins.

Finally, the coatings were respectively subjected to an annealing treatment for 1 hr, obtaining films A, B, C, D, E and F (the molar ratios of [Ag]/[In] were respective of 1, 1.5, 2, 3, 4, and 5).

Characteristics of Ag/In/S Films

Example 2

Crystallization Configuration Analysis

The films A-F were scanned using a grazing-incidence X-ray diffraction machine (MAC SIENCE MXP-18, Japan) with a scan rate of about 2°/second, and a scan rage of about 20-70 degrees, as shown in FIG. 1. The crystallization of film A ([Ag]/[In]=1) was observed to conform to JCPDS CARD NUMBER 25-1329, thereby consisting of a cubic structure of $AgIn_5S_8$. When the molar ratio of [Ag]/[In] was increased from 1.5 (film B) to 4 (film E), the strength of the peak [200] and [320] (orthorhombic structure of $AgInS_2$) were obvious. Therefore, the films B-E are hybrid combinations of $AgInS_2$ and $AgIn_5S_8$. When the molar ratio of [Ag]/[In] was 5 (film F), the crystallization of film F ([Ag]/[In]=5) was observed to conform to JCPDS CARD NUMBER 25-1328, thereby consisting of an orthorhombic structure of $AgInS_2$. Accordingly, the method of the invention can prepare compounds with specific ratios between Ag, In, and S.

Example 3

Current Measurement in a Dark/Bright State

The current of the films A-F in a dark state and a bright state were measured by the method as disclosed below:

The photo current was measured by a third-electrode system, wherein the obtained film served as a work electrode, the saturated calomel electrode (containing saturated KCl solution) served as a reference electrode, and a platinum plate served as an accessorial electrode. The substrate with ITO and the Ag/In/S film was cut to obtain slices (1 cm$^2$) serving as samples. A silver wire was fixed on the ITO surface of the sample by adhesion, and the distance between the Ag/In/S film and the silver wire was 0.5 cm. Next, the sample was encapsulated by an epoxy resin and dried. During the measurement process, the photo reactor was filled with an electrolyte. The distance between the sample and a quartz glass of the photo reactor was 5 cm, and a xenon lamp (300 W) with an attachment lens (AM 0 and AM 1.5) was employed as a light source. Further, a light-intensity meter was used to ensure that the light-intensity was maintained at 100 mW/cm$^2$. The current was measured by a potentiostat (operation of a chopper mode) with the frequency of 1 time/sec and the scan rate of 2.5 mV/sec. The currents occurring in a bright state and a dark state were both measured with a bias voltage from −1V to 1V.

Figure 2:
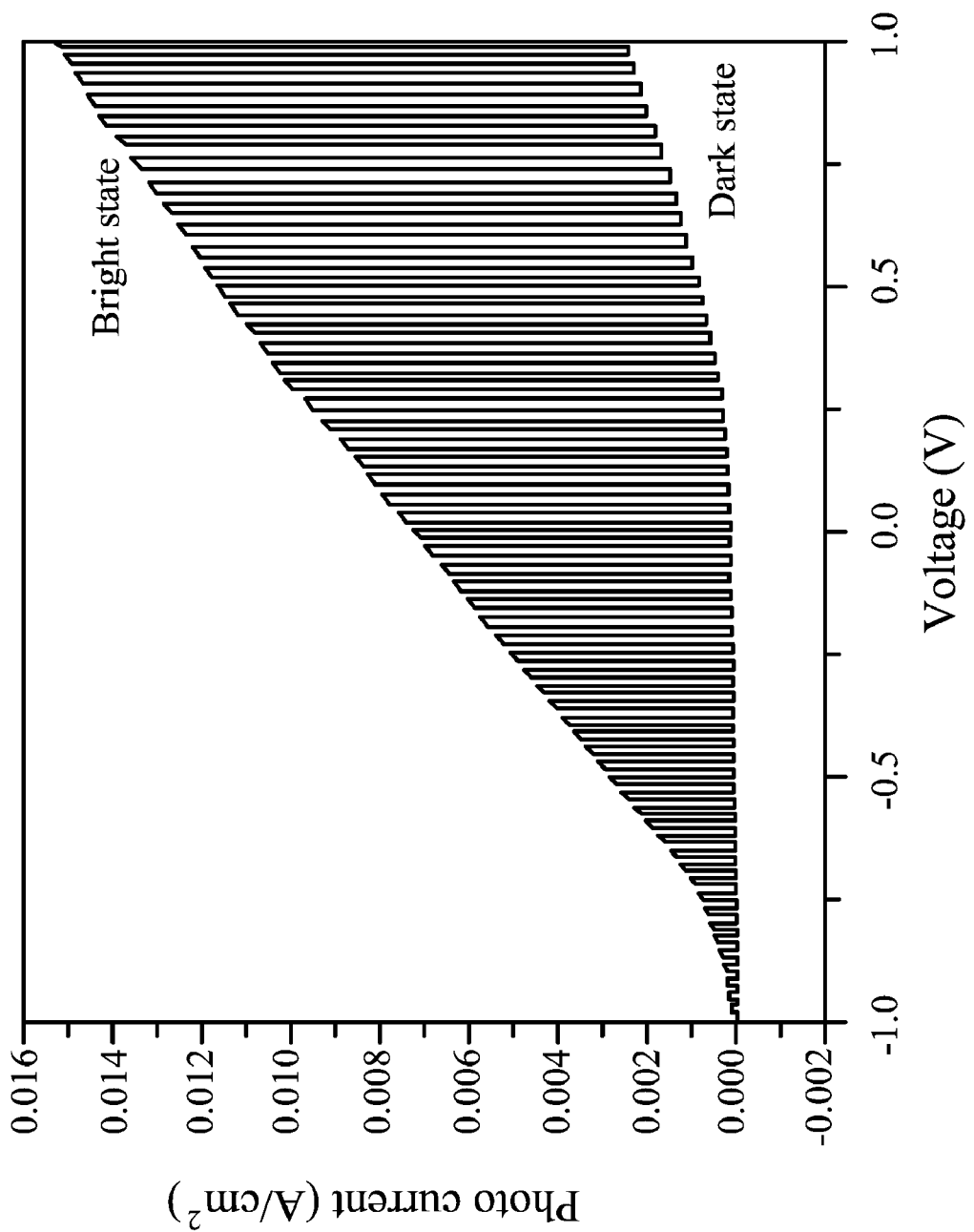
FIG. 2 shows a graph plotting voltage against a photo current of the film E of Example 1 (the molar ratio between Ag and In is 4) under a bright state and a dark state.

When the molar ratio of [Ag]/[In] was 4 (film E), the hybrid combination of $AgInS_2/AgIn_5S_8$ exhibited the highest photo current. As shown in FIG. 2, the difference between a bright state and a dark state was 13 mA/cm$^2$ under the bias voltage of 1V.

Example 4

Energy Gap of Conduction Band and Valence Band

Figure 3:
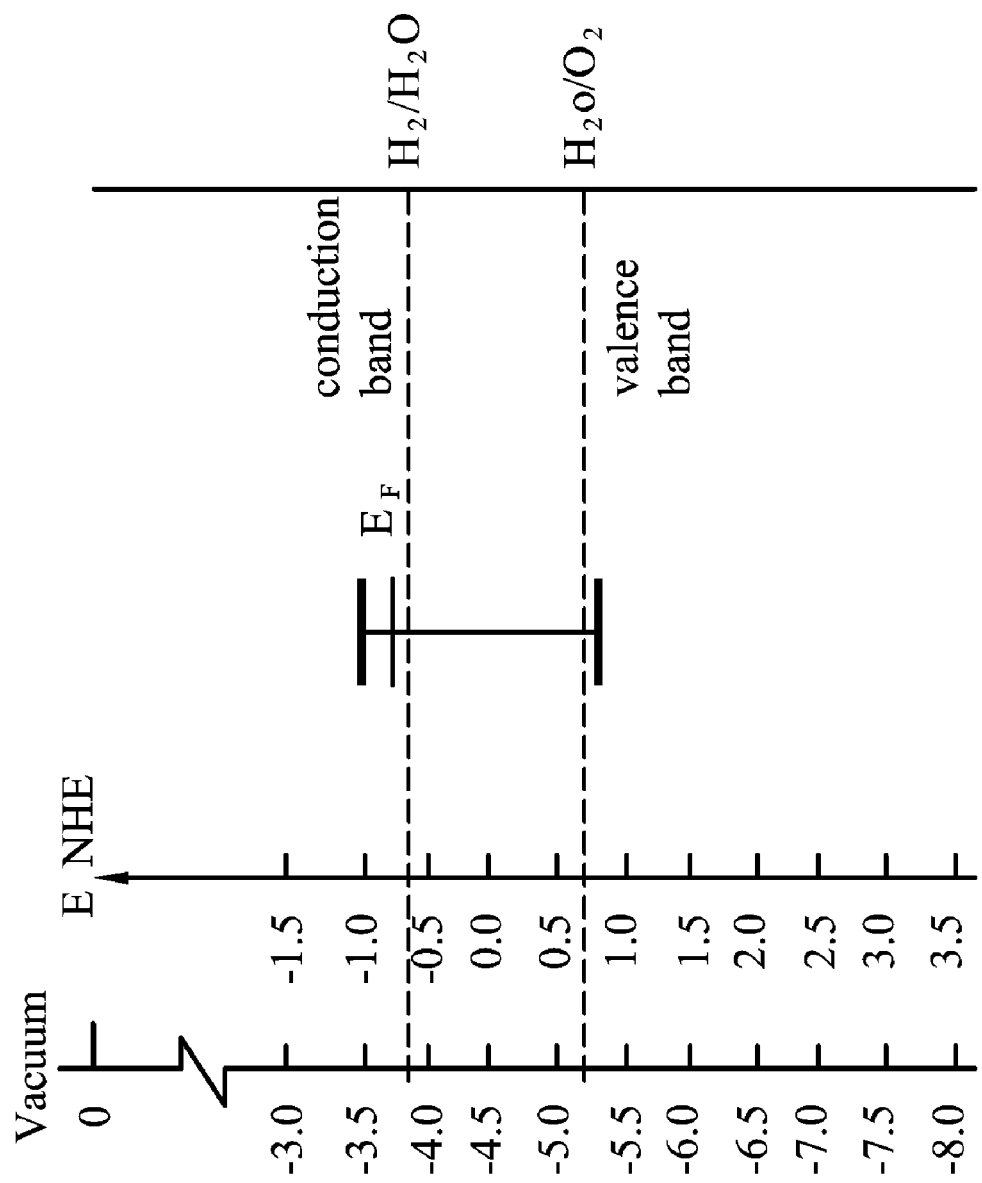
FIG. 3 is a graph showing the valence band and conduction band of the film E of Example 1 (the molar ratio between Ag and In is 4).

The measurement method in Example 4 comprises measuring a flat band voltage by a third-electrode system in advance to calculate the conduction band and valence band of the film. The extrapolation voltage value from $I^2(\lambda)$ (against to voltage) to $I^2(\lambda)=0$ was measured to obtain the flat band voltage. As shown in FIG. 3, the conduction band and valence band of the film E was measured. Since the film E (hybrid combination of $AgInS_2/AgIn_5S_8$) had a valance band and conduction band suitable for water decomposition, the film E can be applied to produce hydrogen gas by water decomposition.

Example 5

Absorbency Spectrum

Figure 4:
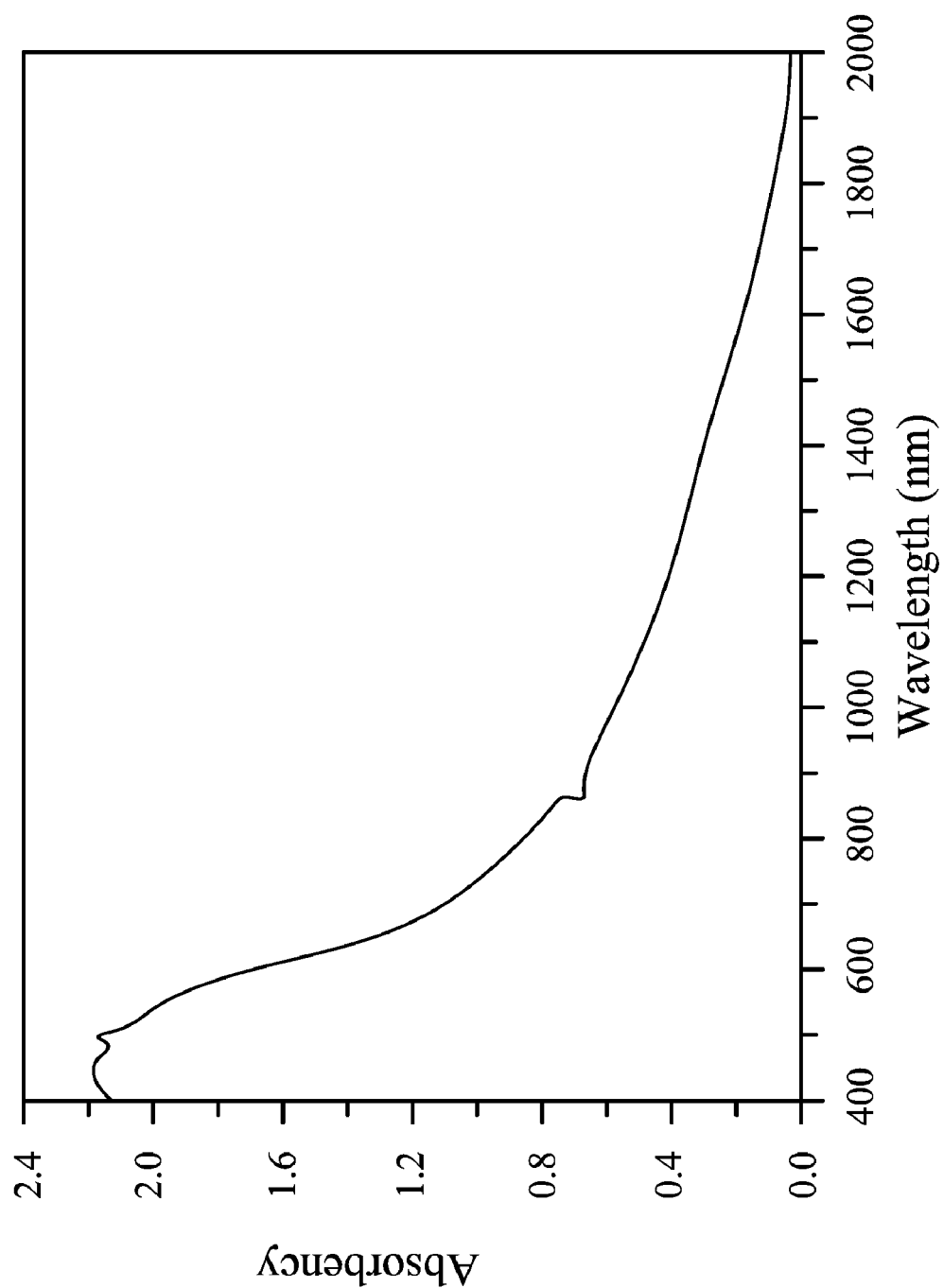
FIG. 4 shows a graph plotting wavelength against absorbency of the film E of Example 1 (the molar ratio between Ag and In is 4).

The absorbency spectrum of the film E was measured by Uv-vis-NIR absorption spectrophotometer with a scan rate of 5 nm/sec. As shown in FIG. 4, the film E had a stronger absorbency between the wavelength of 400~800 nm, which is suitable for serving as a photo-reactive element in a visible light.

Accordingly, since the hybrid combination of $AgInS_2/AgIn_5S_8$ has a valance band and conduction band suitable for water decomposition, the hybrid combination of $AgInS_2/AgIn_5S_8$ can be applied to produce hydrogen gas by water decomposition or to produce C1 fuel from carbon dioxide. Moreover, due to the superior photo current difference between bright and dark states, the hybrid combination of $AgInS_2/AgIn_5S_8$ is suitable for application in solar cell technology.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of fabricating photo energy transformation catalysts, comprising:
    preparing a composition by mixing a solution containing a positive valence Ag, a solution containing a positive valence In, and a solution containing a negative valence S, wherein a molar ratio between Ag and In is 1.5-5;
    adding an acid solution into the composition until a pH value of the composition is not more than 1; and
    forming a film from the composition by liquid phase deposition on a substrate, wherein the film consists essentially of a hybrid combination of $AgInS_2/AgIn_5S_8$.

2. The method as claimed in claim 1, further comprising:
    subjecting the film to an annealing treatment, thereby enhancing the crystallization configuration.

3. The method as claimed in claim 1, wherein the liquid phase deposition comprises a chemical bath deposition (CBD) process.

4. The method as claimed in claim 1, wherein the substrate comprises a conductive substrate.

5. The method as claimed in claim 1, wherein the substrate comprises a metal substrate, a glass substrate with a conductive layer, a silicon wafer, or a plastic substrate.

6. The method as claimed in claim 1, wherein the solution containing a positive valence Ag comprises silver nitrate.

7. The method as claimed in claim 1, wherein the solution containing a positive valence In comprises indium nitrate.

8. The method as claimed in claim 1, wherein the solution containing a negative valence S comprises thioacetamide (TAA).

9. The method as claimed in claim 1, wherein the composition further comprises a complexing agent.

10. The method as claimed in claim 9, wherein the complexing agent comprises an ammonia nitrate aqueous solution, a triethanolamine (TEA), or a combination thereof.

11. The method as claimed in claim 1, wherein the acid solution comprises sulfuric acid or nitric acid.

12. The method as claimed in claim 1, wherein the volume ratio between the solutions containing a positive valence Ag and a positive valence In and the solution containing a negative valence S is 1:1~1:20.

13. The method as claimed in claim 3, wherein the temperature of the chemical bath deposition process is between 40 and 90° C.

14. A method of fabricating photo energy transformation catalysts, comprising:

preparing a composition by mixing a solution containing a positive valence Ag, a solution containing a positive valence In, a solution containing a negative valence S, and a complexing agent, wherein a molar ratio between Ag and In is 1.5-5, wherein the complexing agent has a concentration of between 0.3M~0.5M;

adding an acid solution into the composition until a pH value of the composition is not more than 1; and forming a film from the composition by liquid phase deposition on a substrate, wherein the film consists essentially of a hybrid combination of $AgInS_2/AgIn_5S_8$.

* * * * *